United States Patent Office.

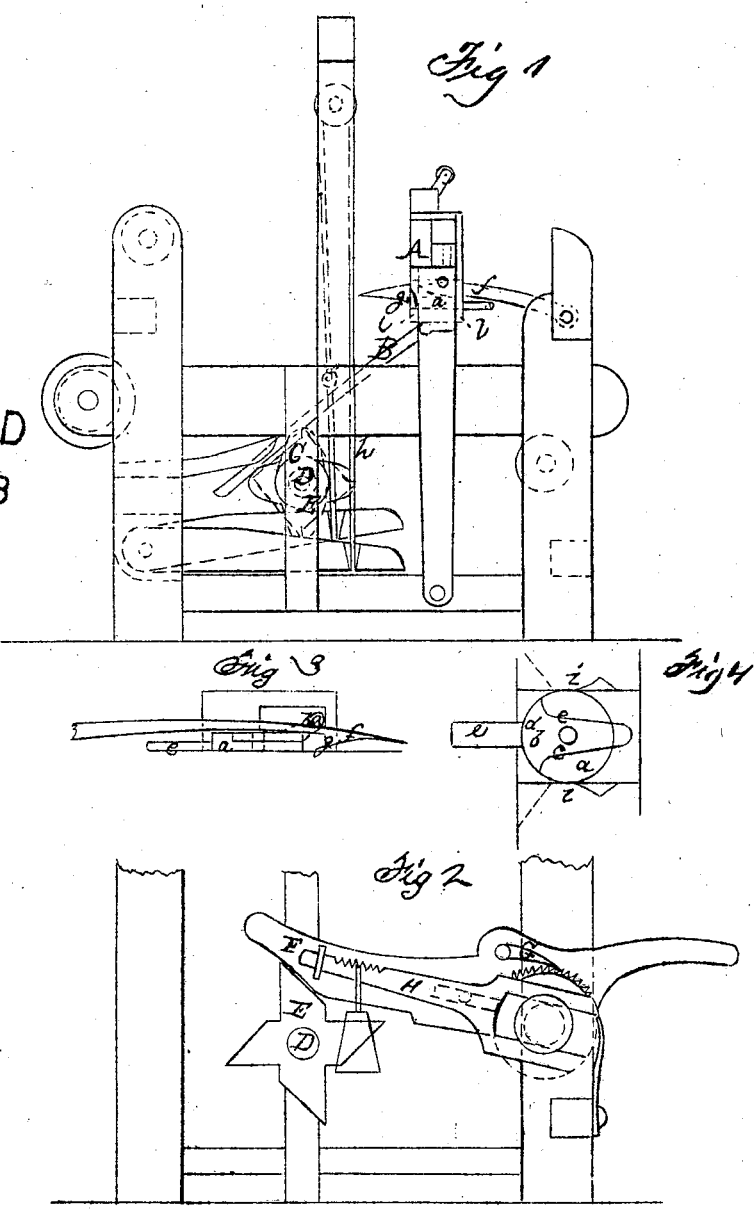

OLIVER STRONG, OF GREEN CENTRE, INDIANA.

Letters Patent No. 73,266, dated January 14, 1868.

---

IMPROVEMENT IN HAND-LOOM.

---

The Schedule referred to in these Letters Patent and making part of the same.

---

TO ALL WHOM IT MAY CONCERN:

Be it known that I, OLIVER STRONG, of Green Centre, in the county of Noble, and State of Indiana, have invented certain new and useful Improvements in Hand-Looms; and I do hereby declare that the following is a full, clear, and exact description thereof, reference being had to the accompanying drawings, and to the letters of reference marked thereon. In the drawings—

Figure 1 represents a side view.

Figure 2 represents a detached side view.

Figures 3 and 4 are detached views.

The nature of my invention consists in so constructing hand-looms that by vibration of the lathe the picker-staves, the heddles, and the cloth-beam, and their appendages, are operated automatically, each thereby performing their respective functions in the most simple, direct, and effective manner, as will be more fully hereinafter described.

To enable others skilled in the arts to make and use my invention, I will proceed to describe its construction and operation.

A represents the lay, which is pivoted, at its lower end, to the framework of the loom. Said lay is provided with the ordinary shuttle-blocks and other appliances, for the purposes of reciprocating the shuttles that are ordinarily found in the class of looms to which this belongs.

The picker-staves are constructed and operate as follows: *a* represents a disk, upon the upper surface of which is formed a peculiarly-shaped projection, *b*, as seen in the drawings, fig. 3. The sides *c c* of said projection, are curved out, as seen, while its rear end, *d*, curves upward. *e* represents an arm, which extends to the front, and to which the shuttle-blocks are attached by means of cords. Disk *a* is secured, by means of a pivot, in a suitable recess formed in the lay-head, between two blocks, *i i*, which are so recessed at their inner sides as to partially admit the introduction of the curved projection *d*, alternately in its vibrations. *f* represents a pivoted arm, curved, as seen in the drawings, and is provided with a catch, *g*, which takes hold of the curved shoulders at *c c* of the disk, and turns the disk alternately from side to side, at the proper point, in such a manner as to impart an oscillating motion to arm *e*, and thus operate the shuttle. This movement is effected by the backward movement of the lay. Arm *f*, while the lay is coming forward, is slightly raised by the projection *d* and the incline on the under side of said arm, and thus is enabled to slide readily over the surface of the projection, and the motion is thus most effectually reversed. B represents a slotted pawl, which is pivoted to the lay, as seen in the drawings, and takes hold of a ratchet, C, seen in dotted lines, fig. 1. Said ratchet is provided with four teeth, hold of which said pawl takes, and thus an intermittent rotary motion is imparted to the axle D. This intermittent rotary motion is so timed as to impart to the heddles, by means of suitable eccentrics, a vibrating motion, as will be readily understood. Said heddles are connected by means of suitable rods, *n*, and cords, to the treadles, as seen in the drawings, said rods being so formed as to pass under the treadle, and thence on each side of the same, vertically, to the point where the heddle-cords are connected, thus leaving a sufficient space between them to admit the free passage of the eccentric in their revolutions. The advantages derived from this device are, that I am enabled to drop the cords from the heddle-staves vertically, to the heddles, and thereby obtain a connection near the point of contact of the eccentrics with the heddles. E represents a tappet-wheel, which is provided with one or more projections, formed as seen in fig. 2, which act upon the inclined surface of lever F, in such a manner as to raise and lower it, as will be seen on referring to the drawings. G represents a hooked pawl, which is pivoted to lever F, and takes into and acts upon a ratchet, which is secured to the cloth-beam, and thus imparts to the said cloth-beam an intermittent rotary motion, for the purpose of taking up the cloth as fast as made. H represents a lever, which acts as a regulator or governor, for the purpose of regulating the amount of tension necessary to be applied in the process of weaving. The front end of said lever is forked on to the cloth-beam, as seen in fig. 2, and extends thence backward, and is supported at the opposite end by means of a suitable loop, through which it passes. Said lever is provided, at or near the cloth-beam, with an arm, which projects parallel with the cloth-beam, and at right angles to the lever, in such a manner that as the cloth accumulates on the beam, and thus increases the leverage and decreases the tension on the cloth, it forces against said arm, and thus carries the lever backward with its weight, which has previously been adjusted to suit the required tension on any given fabric, and equalizes the tension through the entire length.

The operation of my loom is as follows: The lay is vibrated in the ordinary manner, and at each vibration the picker-staff is alternately oscillated, as described, and thus the shuttle is operated. The vibration of the lay also operates the pawl and ratchet on the eccentric-shaft, and imparts to it an intermittent rotary motion, as described, thus giving, through the medium of the treadles, the proper alternate reciprocating motion to the heddles. The automatic self-adjusting weighted lever receives its motion also from the vibration of the lay, through the medium of the tappet-wheel and its appendages, as described and set forth. It will be observed that all of these motions are derived from the centre of the head of the lay, rather than from either end, thus avoiding all side motion or twist in the lay, which, in all cases, must prove very detrimental to the operation of the same, and to the fabric being made, as it will not beat the filling at right angles to the warp.

I claim the tappet-wheel E, lever F, pawl G, and ratchet or cloth-beam, the weighted lever and arm, the same being combined in the manner and constructed as and for the purposes substantially as set forth.

OLIVER STRONG.

Witnesses:
   H. F. WILLSON,
   GEO. ESMOND.